United States Patent
Wada et al.

(10) Patent No.: US 9,663,920 B2
(45) Date of Patent: May 30, 2017

(54) CAB FOR WORK VEHICLE AND A METHOD OF MANUFACTURING SAME

(71) Applicant: KOMATSU LTD., Tokyo (JP)

(72) Inventors: Takeshi Wada, Takatsuki (JP); Kentaro Watanabe, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/895,263

(22) PCT Filed: Jul. 1, 2015

(86) PCT No.: PCT/JP2015/069050
§ 371 (c)(1),
(2) Date: Dec. 2, 2015

(87) PCT Pub. No.: WO2015/174552
PCT Pub. Date: Nov. 19, 2015

(65) Prior Publication Data
US 2017/0002543 A1    Jan. 5, 2017

(51) Int. Cl.
*E02F 9/16* (2006.01)
*B62D 33/06* (2006.01)
*E02F 3/32* (2006.01)

(52) U.S. Cl.
CPC .......... *E02F 9/163* (2013.01); *B62D 33/0617* (2013.01); *E02F 9/16* (2013.01); *E02F 3/32* (2013.01)

(58) Field of Classification Search
CPC .... E02F 3/32; E02F 9/16; E02F 9/163; B62D 33/0617
(Continued)

(56) References Cited

U.S. PATENT DOCUMENTS 3,578,377 A    5/1971  Babbitt, Jr.
7,306,280 B1 *  12/2007  Kraimer .............. B66F 9/07545
                                            280/756
(Continued)

FOREIGN PATENT DOCUMENTS

CN    1980827 A    6/2007
CN    101561835 A    10/2009
(Continued)

OTHER PUBLICATIONS

The Office Action for the corresponding Chinese application No. 201580000846.8, issued on May 3, 2016.
(Continued)

*Primary Examiner* — D Glenn Dayoan
*Assistant Examiner* — Dana D Ivey
(74) *Attorney, Agent, or Firm* — Global IP Counselors, LLP

(57) ABSTRACT

A cab for a work vehicle is equipped with a standard frame and a reinforcing beam. The standard frame includes a main frame and a roof plate. The main frame includes an upper left frame and an upper right frame that extend longitudinally. The upper left frame and the upper right frame are arranged horizontally separated from each other. The roof plate is provided on the upper surface of the main frame. The roof plate is attached to the upper left frame and to the upper right frame. The reinforcing beam is attached to the upper left frame and the upper right frame. The reinforcing beam is arranged above the roof plate and includes an upwardly protruding bend.

19 Claims, 9 Drawing Sheets

(58) Field of Classification Search
USPC .................................................. 296/190.03
See application file for complete search history.

(56) References Cited

U.S. PATENT DOCUMENTS

| | | | |
|---|---|---|---|
| 7,712,824 B2* | 5/2010 | Mori | B62D 33/0617 |
| | | | 296/190.03 |
| 2002/0135207 A1 | 9/2002 | Sakyo | |
| 2007/0187991 A1 | 8/2007 | Mori | |
| 2010/0032984 A1 | 2/2010 | Murakami et al. | |

FOREIGN PATENT DOCUMENTS

| | | |
|---|---|---|
| CN | 202000392 U | 10/2011 |
| CN | 102720238 A | 10/2012 |
| JP | 8-302743 A | 11/1996 |
| JP | 2001-279721 A | 10/2001 |
| JP | 2004-238122 A | 8/2004 |
| JP | 2007-69776 A | 3/2007 |
| JP | 2009-137370 A | 6/2009 |
| JP | 2010-43412 A | 2/2010 |
| KR | 10-0435712 B1 | 6/2004 |
| WO | 2006/008985 A1 | 1/2006 |

OTHER PUBLICATIONS

The Office Action for the corresponding Japanese application No. 2015-542106, issued on May 10, 2016.
International Search Report for the corresponding international application No. PCT/JP2015/069050, issued on Aug. 18, 2015.

* cited by examiner

CAB FOR WORK VEHICLE AND A METHOD OF MANUFACTURING SAME

CROSS-REFERENCE TO RELATED APPLICATIONS

This application is a U.S. National stage application of International Application No. PCT/JP2015/069050, filed on Jul. 1, 2015.

The present invention relates to a cab for a work vehicle and a method of manufacturing the same.

BACKGROUND

Field of the Invention

The cab of a work vehicle, such as a hydraulic excavator, is equipped with a structure for protecting an operator when the work vehicle overturns (i.e., a Roll-over Protective Structure, ROPS). A specific structure for a ROPS is disclosed in WO2006/008985 for instance. Within the cab disclosed in WO2006/008985, an upper surface beam is provided with notches at the right and left of the center portion of the beam. When the vehicle overturns, the notches influence the deformation of the beam in the cab, causing the beam to bend in a V shape. Thereby, the deformation of the overturned cab does not affect the space occupied by the operator within the cab.

SUMMARY

The load on the overturned cab increases as much as the weight of the work vehicle on which the cab is mounted. Therefore, the cab must be provided with strength in accordance with the weight of the work vehicle. Consequently, different kinds of cabs need to be constructed depending on the weight of the work vehicle. However, the disadvantage is that the requirement for various kinds of cabs complicates the manufacturing steps and reduces the manufacturability of the cab.

In particular, the work vehicle is equipped with a work implement, and various attachments are installed on the work implement, such as a bucket, a breaker, or a ripper. Consequently, even when the body of the work vehicle is the same, the weight of the work vehicle changes depending on the type of work implement that is attached. Despite that, the manufacturability of the work implement is further reduced when different types of cabs are built depending on the type of work implement.

The present invention proposes a cab for a work vehicle with strength in accordance with the weight of the work vehicle, as well as favorable manufacturability.

A cab for a work vehicle according to an exemplary embodiment of the present invention is equipped with a standard frame and a reinforcing beam. The standard frame includes a main frame and a roof plate. The main frame includes an upper left frame and an upper right frame that extend longitudinally. The upper left frame and the upper right frame are arranged separated from each other horizontally. The roof plate is provided on the upper surface of the main frame. The roof plate is installed on the upper left frame and to the upper right frame. The reinforcing beam is attached to the upper left frame and the upper right frame. The reinforcing beam is arranged above the roof plate. The reinforcing beam has an upwardly convex shape.

In a cab for a work vehicle according to the exemplary embodiment, attaching the reinforcing beam to the upper left frame and the upper right frame of the standard frame increases the strength of the standard frame. Hereby it is possible to adjust the strength of the cab depending on the weight of the work vehicle. The reinforcing beam is arranged above the roof plate of the standard frame. The reinforcing beam may therefore be easily added to the standard frame afterward. Thus, a reinforcing beam may be installed in accordance with the weight of the work vehicle while the standard frame is provided as a common structure. Hereby, a cab may be easily constructed with strength in accordance with the weight of the work vehicle, and may have improved manufacturability.

The main frame may further include a main beam attached to the upper left frame and the upper right frame. The main beam may be arranged below the roof plate. In this case, the main beam increases the strength of the standard beam. Additionally, the reinforcing beam may be used to reinforce the standard beam when adding only the main beam to the standard beam provides insufficient strength.

The main beam may include a bend inducing part. The bend inducing part influences the bending direction of the main beam when a load is applied to the main beam. In this case, the bend inducing part influences the bending direction of the main beam to thereby prevent the deformation of the overturned cab from affecting the space occupied by an operator inside the cab.

The reinforcing beam does not need to overlap the main beam in a plan view of the cab. This prevents the reinforcing beam from interfering with the bending of the main beam.

The reinforcing beam may be arranged rearward from the main beam. This prevents the reinforcing beam from interfering with the bending of the main beam.

The reinforcing beam may include an upwardly protruding bend. Thus, when the reinforcing beam deforms because the vehicle overturns, the reinforcing beam will bend upward. Hereby, a portion of the energy of deformation received by the cab may be absorbed. Additionally, the bending of the reinforcing beam is prevented from affecting the space occupied by an operator inside the cab.

The bottom surface of the reinforcing beam may include a notch that is recessed upward. Thus, when the reinforcing beam deforms because the vehicle overturns, the reinforcing beam will bend upward. Hereby, a portion of the energy of deformation received by the cab may be absorbed. Additionally, the bending of the reinforcing beam is prevented from affecting the space occupied by an operator inside the cab.

The reinforcing beam may be a plate-like member. In this case, the reinforcing beam is easy to manufacture. Additionally, this minimizes variations in the outward appearance of the cab due to adding the reinforcing beam.

The reinforcing beam may include an opening passing vertically therethrough. This reduces the weight of the reinforcing beam. Therefore, the increase to the weight of the cab due to adding the reinforcing beam is suppressed.

The reinforcing beam may include a left section, a right section, and a center section located between the left section and the right section in the horizontal direction. The reinforcing beam may grow shorter lengthwise from the left section and the right section toward the center section. With this, the reinforcing beam will tend to bend with the center portion thereof as the apex. Hereby, a portion of the energy of deformation received by the cab may be absorbed.

The reinforcing beam may include a left opening and a right opening passing vertically therethrough. The left opening may be located between the left section and the center section. The right opening may be located between the right section and the center section. Thus, the reinforcing beam may be made lightweight. Therefore, the increase to the weight of the cab due to adding the reinforcing beam is suppressed.

The upper left frame and the upper right frame may include attachment parts that include bolt holes. The reinforcing beam may be attached to the attachment parts using bolts. In this case, the reinforcing beam is easy to attach.

The main frame may further include a main beam attached to the upper left frame and the upper right frame. The main beam may include a first bend inducing part that influences a bending site and a bending direction thereof when a load is applied to the cab horizontally. The reinforcing beam may include a second bend inducing part that influences a bending site and a bending direction thereof when a load is applied to the cab horizontally. The reinforcing beam may be arranged at a location that does not overlap the main beam in a plan view.

In this case, the first bend inducing part influences the bending site and the bending direction of the main beam to thereby prevent the deformation of the overturned cab from affecting the space occupied by an operator inside the cab. Additionally, in a plan view of the cab, the reinforcing beam does not overlap the main beam, thereby preventing the reinforcing beam from interfering with the bending of the main beam. Moreover, the second bend inducing part influences the bending site and the bending direction of the reinforcing beam to thereby prevent the reinforcing beam from interfering with the bending of the main beam The bending direction induced by the second bend inducing part may be upward. This prevents the bending of the reinforcing beam from affecting the space occupied by an operator inside the cab.

The bending site induced by the second bend inducing part may be the center section in the horizontal direction of the reinforcing beam. With this, with this, the reinforcing beam will tend to bend with the center portion thereof as the apex. Hereby, a portion of the energy of deformation received by the cab may be absorbed.

The second bend inducing part may be a notch in the bottom surface of the reinforcing beam in the center section in the horizontal direction thereof, the notch extending longitudinally, and recessed upward. Here, the notch influences the bending site of the reinforcing beam to be the center portion, and the bending direction of the reinforcing beam to be upward. The second bend inducing part is also easy to form. Another exemplary embodiment of the present invention is a method of manufacturing a cab for a work vehicle, the method provided with a step of attaching a reinforcing beam to a standard frame in accordance with the weight of a work vehicle. The standard frame includes a main frame and a roof plate. The main frame includes an upper left frame and an upper right frame that extend longitudinally. The upper left frame and the upper right frame are arranged separated from each other horizontally. The roof plate is provided on the upper surface of the main frame. The roof plate is attached to the upper left frame and to the upper right frame. During the step of attaching the reinforcing beam, the reinforcing beam is arranged above the roof plate and attached to the upper left frame and the upper right frame.

In the method of manufacturing a cab for a work vehicle according to the exemplary embodiment, attaching the reinforcing beam on the upper left frame and the upper right frame of the standard frame increases the strength of the standard frame. Hereby it is possible to adjust the strength of the cab depending on the weight of the work vehicle. The reinforcing beam is arranged above the roof plate of the standard frame. The reinforcing beam may therefore be easily added to the standard frame afterward. Thus, a reinforcing beam may be installed in accordance with the weight of the work vehicle while the standard frame is provided as a common structure. Hereby, a cab may be easily constructed with strength in accordance with the weight of the work vehicle, and may have improved manufacturability.

The exemplary embodiments of the present invention provide a cab for a work vehicle with strength in accordance with the weight of the work vehicle, as well as favorable manufacturability.

DESCRIPTION OF EXEMPLARY EMBODIMENTS

Figure 1:
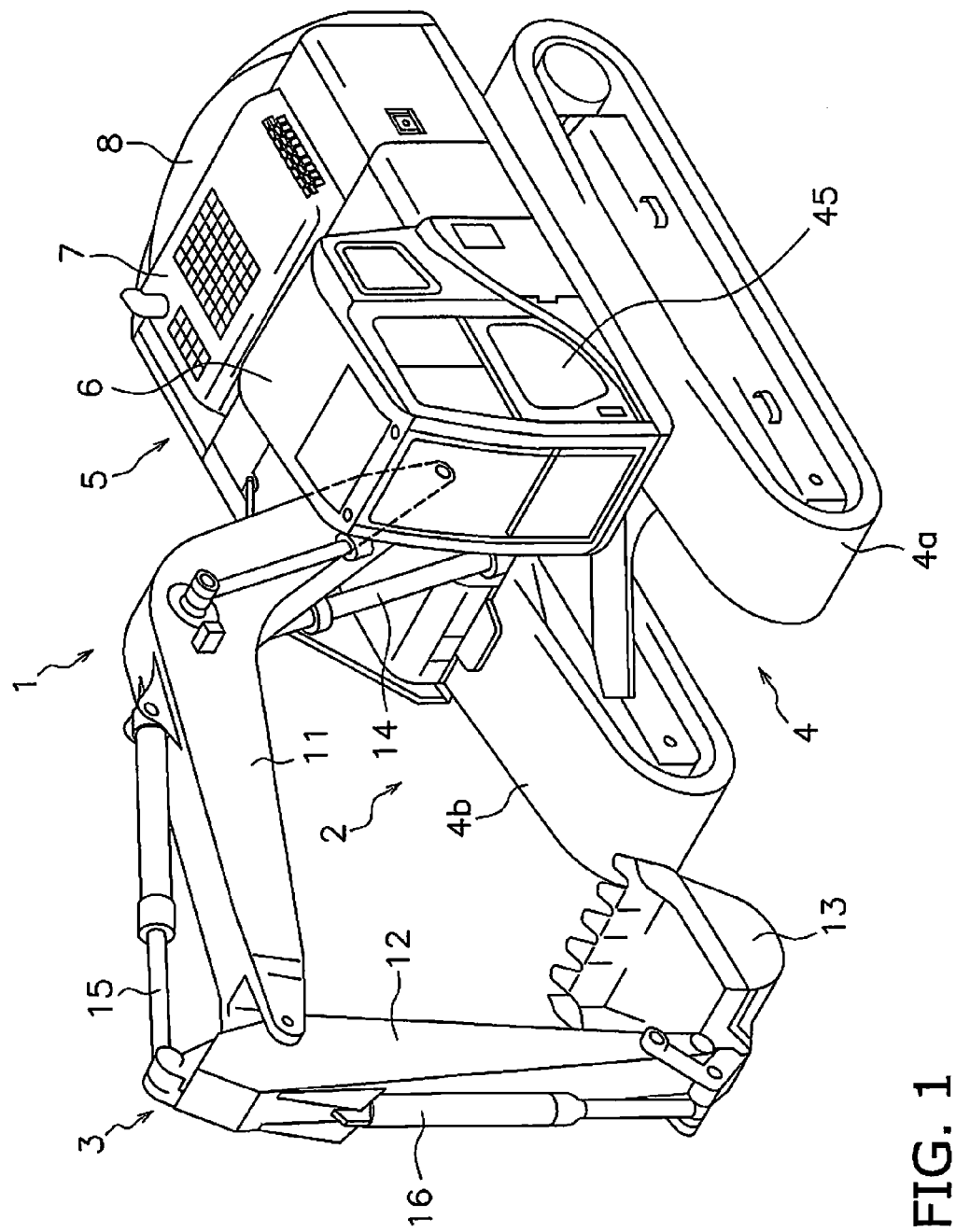
FIG. 1 is a perspective view of a work vehicle according to the exemplary embodiments.

A work vehicle 1 according to the exemplary embodiments is described below with reference to the drawings. FIG. 1 is a perspective view of the work vehicle 1 according to the exemplary embodiments. According to an exemplary embodiment, the work vehicle 1 is a hydraulic excavator. The work vehicle 1 is equipped with a vehicle body 2 and a work implement 3.

The vehicle body 2 includes a traveling unit 4 and a revolving unit 5. The traveling unit 4 includes crawler tracks 4a and 4b. Driving the crawler tracks 4a and 4b causes the work vehicle 1 to move.

The revolving unit 5 is mounted on the traveling unit 4. The revolving unit 5 is provided to be able to turn relative to the traveling unit 4. The revolving unit 5 includes a cab 6. The cab 6 is described later. Note that in the description that follows, each of the directions forward and backward, left and right, and up and down signify the directions forward and backward, left and right, and up and down from the view of an operator sitting in the cab 6.

The revolving unit 5 includes an engine compartment 7, and a counterweight 8. The engine compartment 7 houses equipment, such as an engine and a hydraulic pump (neither shown). The engine compartment 7 is arranged behind the cab 6. The counterweight 8 is arranged behind the engine compartment 7.

The work implement 3 is attached to the revolving unit 5. The work implement 3 is arranged beside the cab 6. The work implement 3 includes a boom 11, an arm 12, and a work implement attachment 13. The work implement 3 further includes a boom cylinder 14, and an arm cylinder 15, and an attachment cylinder 16.

The base end of the boom 11 is rotatably connected to the revolving unit 5. The tip end of the boom 11 is rotatably connected to the base end of the arm 12. The tip end of the arm 12 is rotatably connected to the work implement attachment 13. In the exemplary embodiment, the work implement attachment 13 is a bucket. Note that the work implement attachment 13 is not limited to being a bucket, and may be another work implement attachment.

The boom cylinder 14, the arm cylinder 15, and the attachment cylinder 16 are hydraulic cylinders and are driven with hydraulic fluid. The hydraulic fluid is discharged from a hydraulic pump (not shown). The boom cylinder 14 operates the boom 11. The arm cylinder operates the arm 12. The attachment cylinder 16 operates the work implement attachment 13. Actuating the cylinders 14 to 16 actuates the work implement 3.

Figure 2:
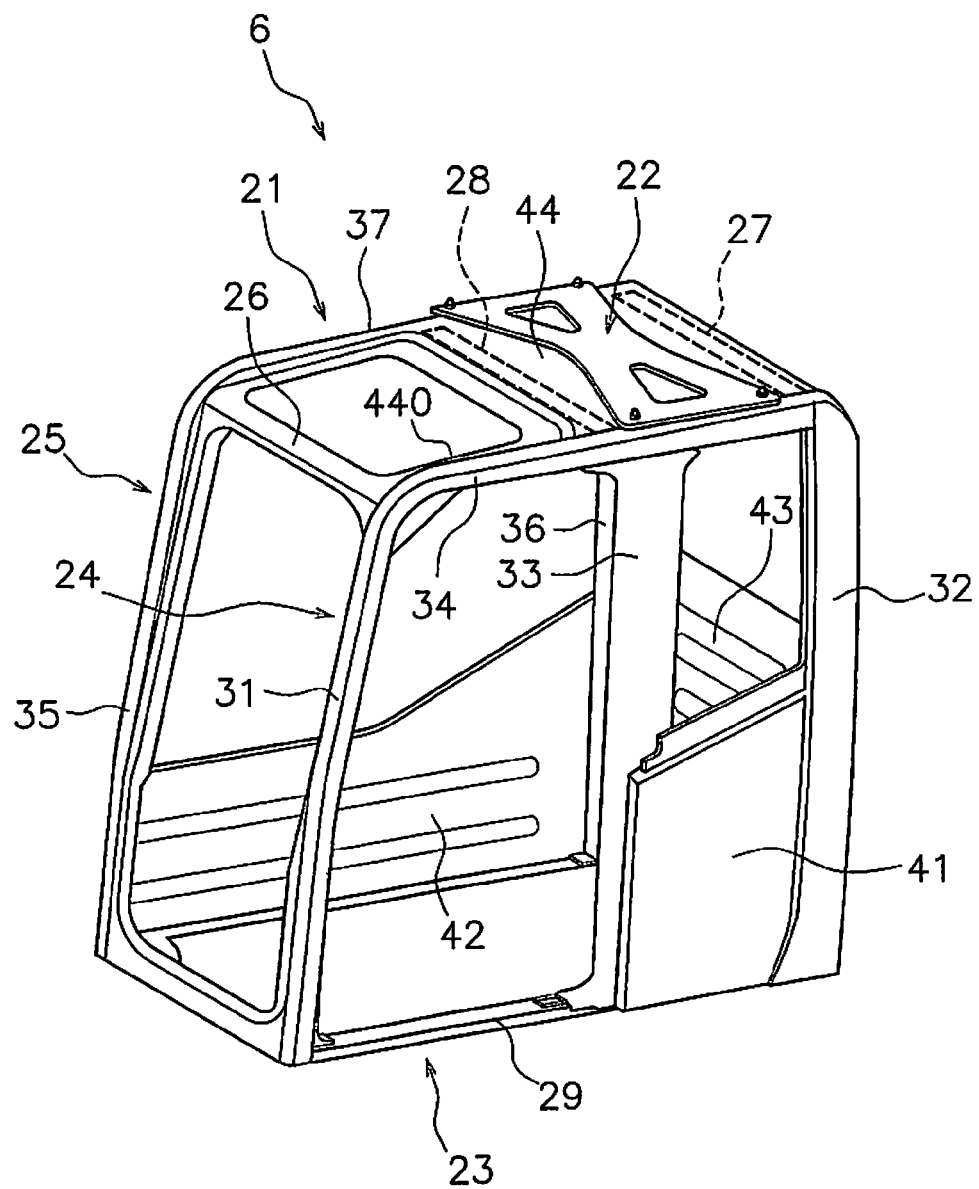
FIG. 2 is a perspective view of a cab.
Figure 3:
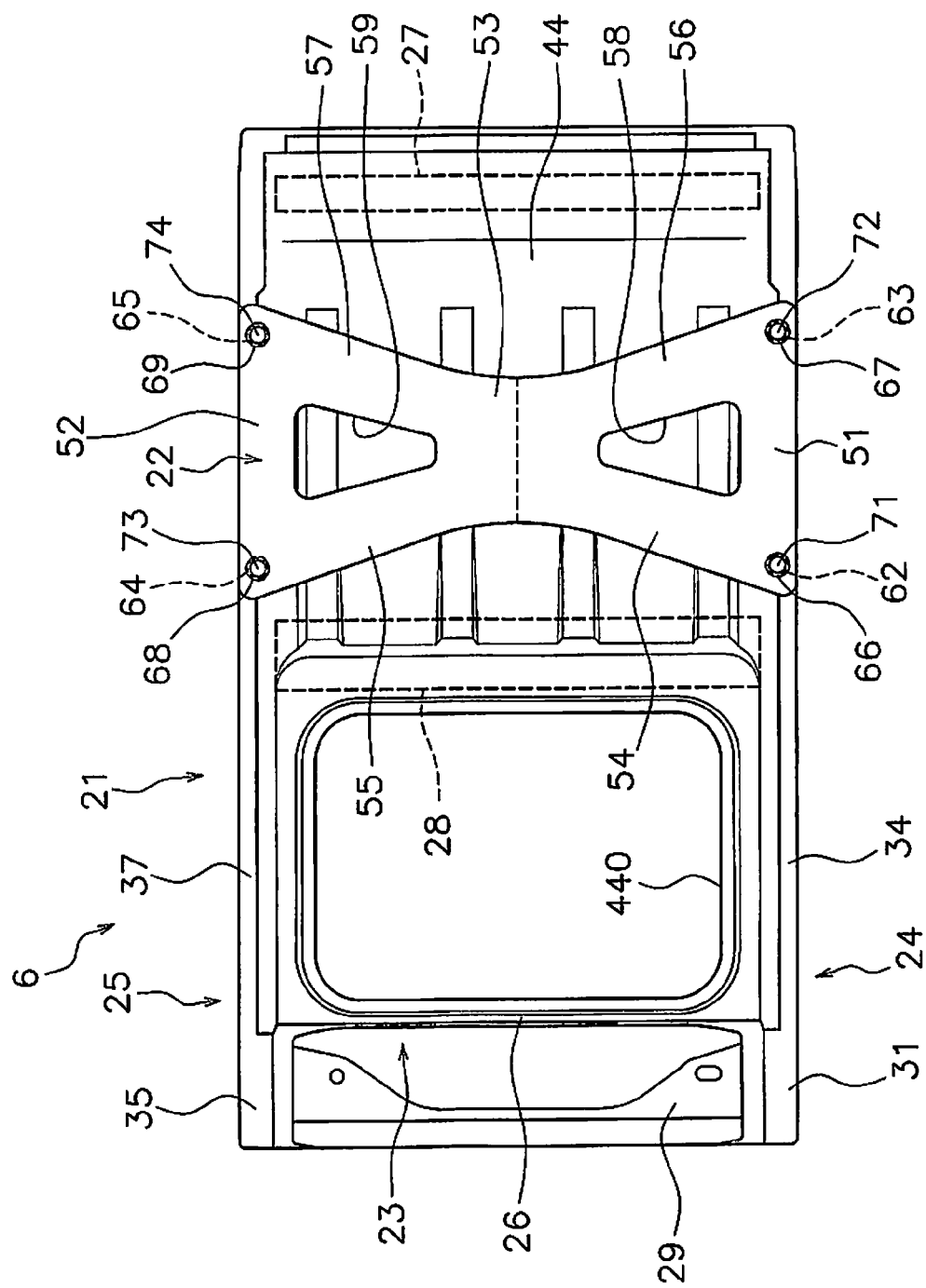
FIG. 3 is a top view of the cab.

Next the cab 6 is described in detail. FIG. 2 is a perspective view of the cab 6. FIG. 3 is a top view of the cab 6. As illustrated in FIG. 2 and FIG. 3, the cab 6 includes a standard frame 21 and a reinforcing beam 22.

The standard frame 21 includes a main frame 23, and a plurality of plates 41 to 44. The main frame 23 includes a left frame section 24, a right frame section 25, a plurality of main beams 26 to 28, and a floor frame 29. The left frame section 24 and the right frame section 25 are arranged separated from each other horizontally.

The left frame section 24 includes a front left pillar 31, a rear left pillar 32, a center left pillar 33, and an upper left frame 34. The front left pillar 31, the rear left pillar 32, and the center left pillar 33 are disposed upright on the floor frame 29. The front left pillar 31 extends vertically. The rear left pillar 32 extends vertically, and is arranged rearward from the front left pillar 31. The center left pillar 33 extends vertically and is disposed between the front left pillar 31 and the rear left pillar 32 in the longitudinal direction. The upper left frame 34 extends longitudinally. The upper left frame 34 is arranged extending rearward from the upper part of the front left pillar 31. The upper left frame 34 connects the upper part of the front left pillar 31 and the upper part of the rear left pillar 32. The upper part of the center left pillar 33 is connected to the front left pillar 31.

The right frame section 25 includes a front right pillar 35, a rear right pillar 36, and an upper right frame 37. The front right pillar 35 and the rear right pillar 36 are disposed upright on the floor frame 29. The front right pillar 35 extends vertically. The rear left pillar 36 extends vertically, and is arranged rearward from the front right pillar 35. The upper right frame 37 extends longitudinally. The upper right frame 37 is arranged extending rearward from the upper part of the front right pillar 35. The upper right frame 37 connects the upper part of the front right pillar 35 and the upper part of the rear right pillar 36.

Note that the front left pillar 31 and the upper left frame 34 are formed as an integral body. The front right pillar 35 and the upper right frame 37 are also formed as an integral body. However, the front left pillar 31 and the upper left frame 34 may be separate from each other and bonded to each other via welding and the like. Similarly, the front right pillar 35 and the upper right frame 37 may be separate from each other and bonded to each other via welding and the like.

The plurality of main beams 26 to 28 extends horizontally, connecting the left frame section 24 and the right frame section 25. The plurality of main beams 26 to 28 may be welded to the left frame section 24 and to the right frame section 25, for instance. The plurality of main beams 26 to 28 contains a first upper main beam 26, a second upper main beam 27, and a third upper main beam 28.

The first upper main beam 26, the second upper main beam 27, and the third upper main beam 28 are arranged on the upper surface of the main frame 23. The first upper main beam 26, the second upper main beam 27, and the third upper main beam 28 are separated longitudinally from each other. The second upper main beam 27 is arranged rearward from the first upper main beam 26.

The third upper main beam 28 is disposed between the first upper main beam 26 and the second upper main beam 27 in the longitudinal direction. The third upper main beam 28 connects the upper left frame 34 and the upper right frame 37. For instance, the third upper main beam 28 may be welded to the upper left frame 34 and to the upper right frame 37. The third upper main beam 28 is arranged directly above an operator's seat disposed inside the cab 6.

The plurality of plates 41 to 44 is attached to the main frame 23. The plurality of plates includes a left-side plate 41, a right-side plate 42, a rear plate 43, and a roof plate 44. The left-side plate 41 is provided on the left-side surface of the main frame 23. The left-side plate 41 is attached to the center left pillar 33 and to the rear left pillar 32, extending therebetween. A door 45 (refer to FIG. 1) that opens and closes to allow an operator to board and exit the cab 6 is arranged between the center left pillar 33 and the front left pillar 31.

The right-side plate 42 is provided on the right-side surface of the main frame 23. The right-side plate 42 is attached to the front right pillar 35 and to the rear right pillar 36, extending therebetween. The rear plate 43 is provided on the rear surface of the main frame 23. The rear plate 43 is attached to the rear left pillar 32 and the rear right pillar 36, extending therebetween.

The roof plate 44 is provided on the upper surface of the main frame 23. The roof plate 44 is attached to the upper left frame 34 and to the upper right frame 37, extending therebetween. The roof plate 44 is attached to the first upper main beam 26 and to the second upper main beam 27, extending therebetween. The third upper main beam 28 is arranged below the roof plate 44. That is, the third upper main beam 28 overlaps the roof plate 44 in a plan view.

The roof plate 44 includes an opening 440. A roof window is installed in the opening 440. The opening 440 is located in front of the third upper main beam 28. In a plan view, the opening 440 is located between the first upper main beam 26 and the third upper main beam 28. The opening 440 does not overlap the third upper main beam 28 in a plan view.

Figure 4:
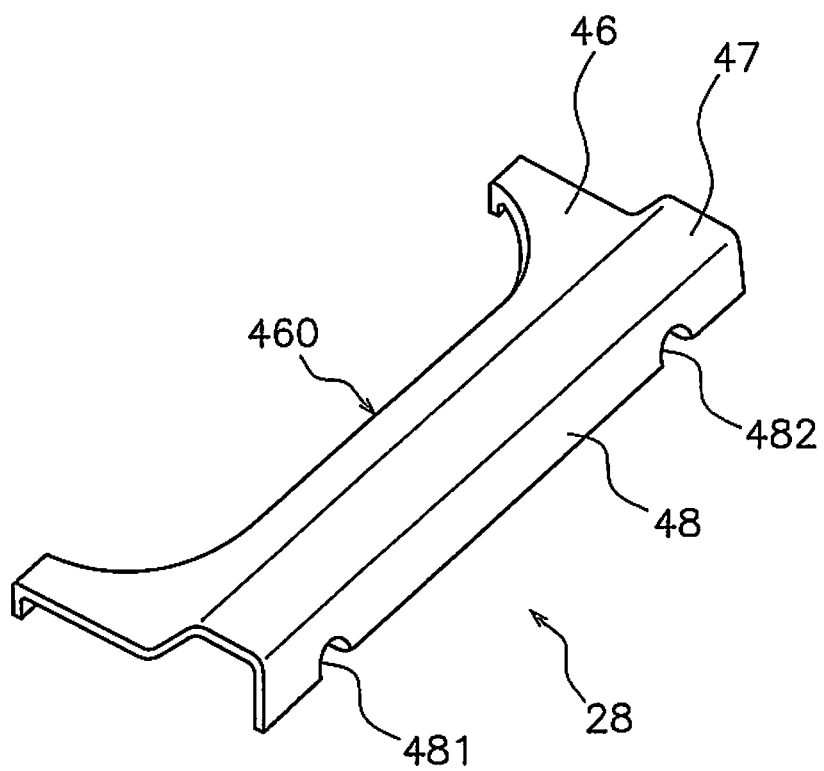
FIG. 4 is a perspective view of a third upper main beam.

FIG. 4 is a perspective view of the third upper main beam 28. As illustrated in FIG. 4, the third upper main beam 28 is formed from a plate-like material that bent vertically. The rear part of the third upper main beam 28 bends downward. The third upper main beam 28 includes a first lateral panel part 46, a second lateral panel part 47, and a vertical panel part 48. The first lateral panel part 46 and the second lateral panel part 47 extend longitudinally. The first lateral panel part 46 includes a recess 460 that dips rearward. The recess 460 has a form that follows along the opening 440 in the roof plate 44. The front part of the first lateral panel part 46 bends downward.

The second lateral panel part 47 is located rearward from the first lateral panel part 46. The second lateral panel part 47 is located upward from the first lateral panel part 46. This creates a step between the second lateral panel part 47 and the first lateral panel part 46. The vertical panel part 48 extends downward from the rear end of the second lateral panel part 47.

A plurality of bend inducing parts 481 and 482 (first bend inducing parts) is provided at the lower end of the rear part of the third upper main beam 28. In other words, the plurality of bend inducing parts 481 and 482 is provided at the lower end of the vertical panel part 48. The plurality of bend inducing parts 481 and 482 influences the bending site and the bending direction of the third upper main beam 28 when a load is placed on the third upper main beam 28. The plurality of bend inducing parts 481 and 482 is notches that dip upward. The plurality of bend inducing parts 481 and 482 is shaped as an arc.

The plurality of bend inducing parts 481 and 482 includes a bend inducing part 481 and a bend inducing part 482. The bend inducing part 481 and the bend inducing part 482 are arranged separated from each other in the horizontal direction. The bend inducing part 481 and the bend inducing part 482 are arranged horizontally at the left and the right of the center portion of the third upper main beam 28. The bend inducing parts 481 and 482 are arranged distant from the horizontal center (center lengthwise) of the third upper main beam 28.

Figure 5:
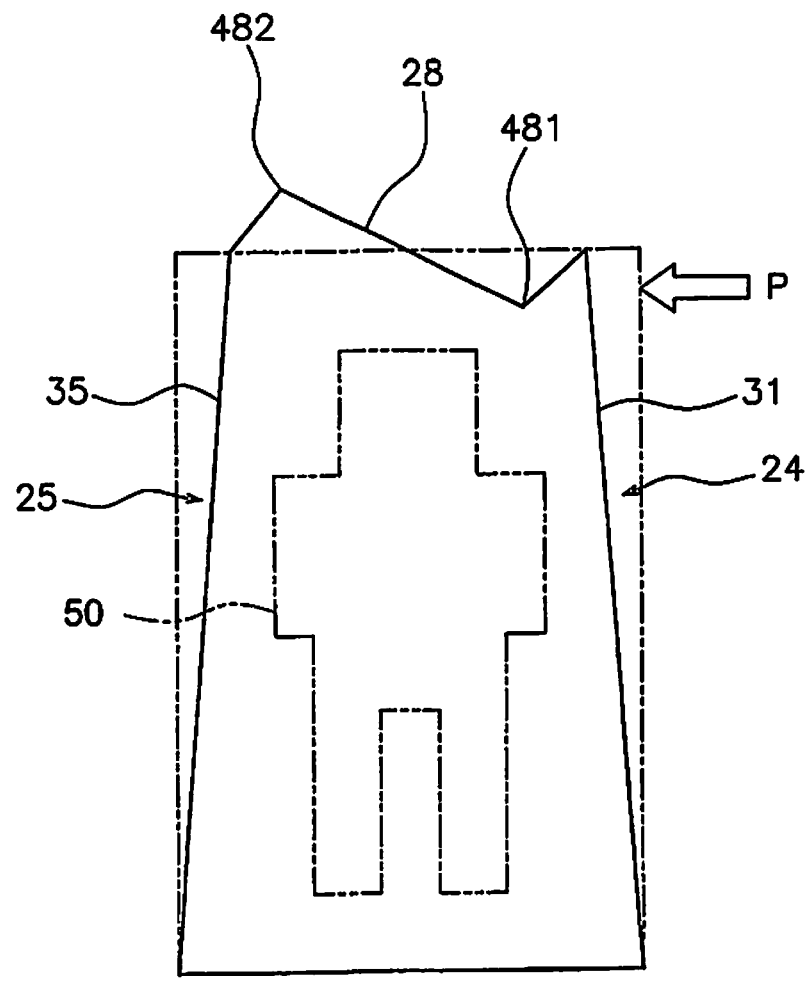
FIG. 5 illustrates a deformation form of the cab.

When the work vehicle 1 rolls over, a large lateral load P is applied to the upper part of the left side surface of the cab 6 toward the right as illustrated in FIG. 5. When the third upper main beam 28 is compressed due to this lateral load P that is exerted horizontally on the cab, the third upper main beam 28 buckles starting at the bend inducing part 481 and at the bend inducing part 482. At this point the third upper main beam 28 bends downward at the bend inducing part 481, and bends upward at the bend inducing part 482. Hereby, the deformed third upper main beam 28 is prevented from interfering with a space 50 that may be conceivably be occupied by an operator when the operator is seated. The plurality of bend inducing parts 481 and 482 is provided to influence the deformation of the third upper main beam 28, and the third upper main beam 28 is provided to not interfere with the space 50 that may conceivably be occupied by an operator when the operator is seated.

The reinforcing beam 22 is described next. The reinforcing beam 22 is a separate unit from the standard frame 21 and may be attached to the standard frame 21. The reinforcing beam 22 is a separate unit from the roof plate 44. More specifically, the reinforcing beam 22 is attached to the upper left frame 34 and the upper right frame 37. As illustrated in FIG. 2 and in FIG. 3, the reinforcing beam 22 is arranged above the roof plate 44. The reinforcing beam 22 overlaps the roof plate 44 in a plan view. The reinforcing beam 22 also overlaps the upper left frame 34 and the upper right frame 37 in a plan view.

The reinforcing beam 22 is disposed between the second upper main beam 27 and the third upper main beam 28 in the longitudinal direction. Namely, the reinforcing beam 22 is arranged rearward from the third upper main beam 28, and in a plan view of the cab 6 the reinforcing beam 22 does not overlap the third upper main beam 28. Additionally, the reinforcing beam 22 is arranged frontward from the second upper main beam 27, and in a plan view of the cab 6 the reinforcing beam 22 does not overlap the second upper main beam 27.

Figure 6:
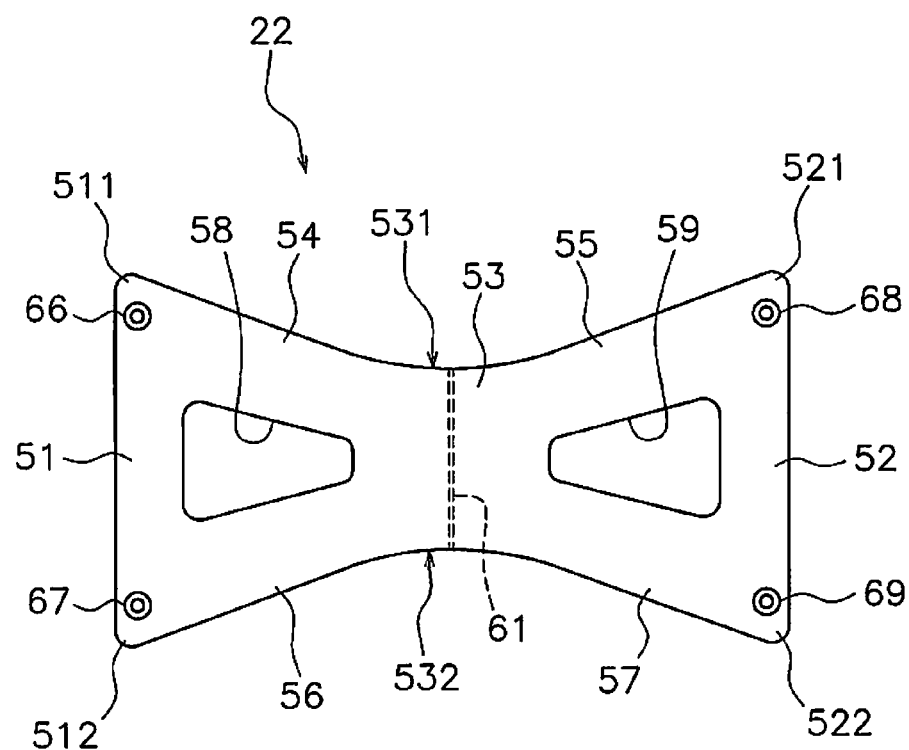
FIG. 6 is a top view of a reinforcing beam.
Figure 7:
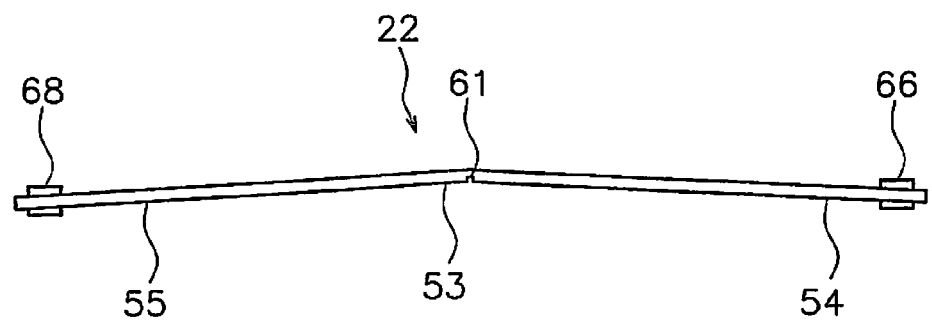
FIG. 7 is a front view of the reinforcing beam.
Figure 8:
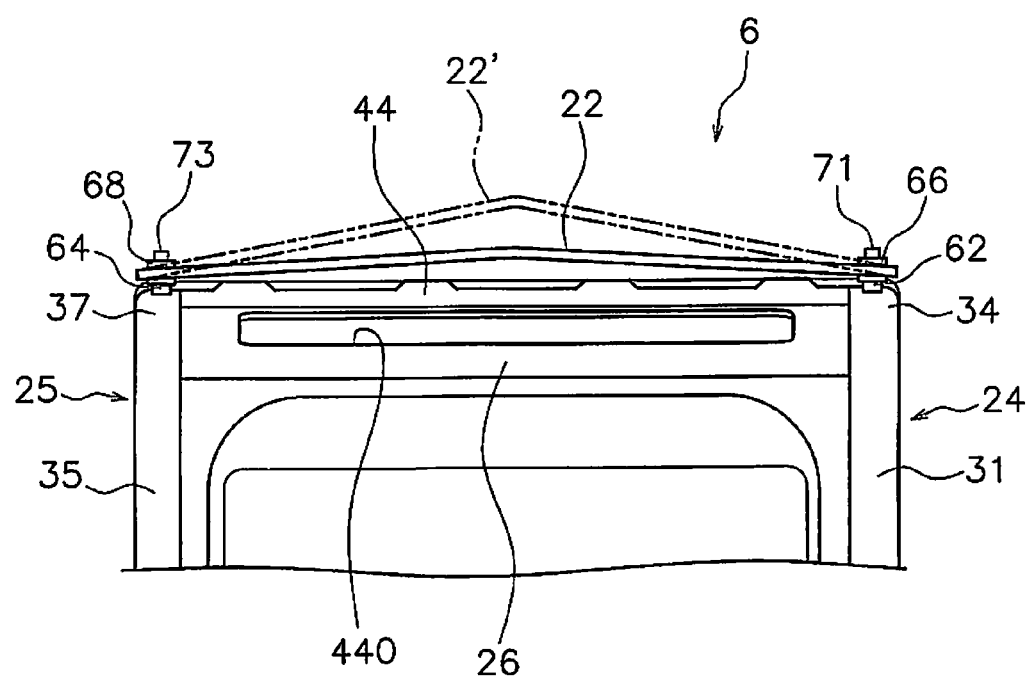
FIG. 8 is a front view of an upper part of the cab.

FIG. 6 is a top view of the reinforcing beam 22. FIG. 7 is a front view of the reinforcing beam 22. FIG. 8 is a front view of an upper part of the cab 6. The reinforcing beam 22 is a thin panel. The reinforcing beam 22 is left-right symmetric.

As illustrated in FIG. 6, the reinforcing beam 22 includes a left section 51, a right section 52, and a center section 53. The center section 53 is located between the left section 51 and the right section 52 in the horizontal direction. The reinforcing beam 22 grows shorter lengthwise from the left section 51 toward the center section 53. The reinforcing beam 22 grows shorter lengthwise from the right section 52 toward the center section 53. When the lateral force P is applied to the upper part of the cab 6 in the horizontal direction, due to the above-described shape the bending site is guided to the center section 53 along the horizontal direction (lengthwise) of the reinforcing beam 22.

More specifically, the reinforcing beam 22 includes a front left slanted section 54 and a front right slanted section 55. The front left slanted section 54 connects the front part of the left section 51 and the front part of the center section 53. The front left slanted section 54 slants rearward toward the center section 53. The front right slanted section 55 connects the front part of the right section 52 and the front part of the center section 53. The front right slanted section 55 slants rearward toward the center section 53.

The reinforcing beam 22 includes a rear left slanted section 56 and a rear right slanted section 57. The rear left slanted section 56 connects the rear part of the left section 51 and the rear part of the center section 53. The rear left slanted section 56 slants frontward toward the center section 53. The rear right slanted section 57 connects the rear part of the right section 52 and the rear part of the center section 53. The rear right slanted section 57 slants frontward toward the center section 53.

The left section 51 includes a front left corner 511 and a rear left corner 512. The front left corner 511 and the rear left corner 512 are curved. The right section 52 includes a front right corner 521 and a rear right corner 522. The front right corner 521 and the rear right corner 522 are curved.

The center section 53 includes a front edge 531 and a rear edge 532. The front edge 531 of the center section 53 is curved. The curve of the front edge 531 of the center section 53 protrudes rearward. The rear edge 532 of the center section 53 is curved. The curve of the rear edge 532 of the center section 53 protrudes frontward.

The reinforcing beam 22 includes a left opening 58 and a right opening 59. The left opening 58 is located between the left section 51 and the center section 53 passing through the reinforcing beam 22 vertically. The left opening 58 is located between the front left slanted section 54 and the rear left slanted section 56. The right opening 59 is located between the right section 52 and the center section 53 passing through the reinforcing beam 22 vertically. The right opening 59 is located between the front right slanted section 55 and the rear right slanted section 57. The left opening 58 and the right opening 59 are each substantially triangular. However, the corners of the left opening 58 and the right opening 59 are curved.

As illustrated in FIG. 7, the reinforcing beam 22 has an upwardly convex shape. The reinforcing beam 22 includes an upwardly protruding bend where the horizontal center thereof is the apex. The bottom surface of the reinforcing beam 22 includes a notch 61 recessed upward at the horizontal center thereof. The notch 61 extends longitudinally. As illustrated in FIG. 8, the notch 61 is provided so that the reinforcing beam 22 deforms protruding upward when, as above described, a large lateral load P is applied to the upper part of the cab 6. Note that the reference numeral 22' in FIG. 8 represents the deformed reinforcing beam 22.

The above-described shape of the center section 53, as well as the notch 61 induces the center section 53 of the reinforcing beam 22 to be the bending site thereof and induces the bending direction of the reinforcing beam to be upward when the lateral load P is exerted horizontally on the upper part of the cab 6. A part that influences the bending site and the bending direction of the reinforcing beam 22 is a second bend inducing part. Accordingly, the center section 53 and the notch 61 are equivalent to the second bend inducing part.

As illustrated in FIG. 3, the standard frame 21 includes a plurality of attachment parts 62 to 65 for attaching the reinforcing beam 22. The plurality of attachment parts 62 to 65 is provided on the upper left frame 34 and the upper right frame 37. More specifically, the plurality of attachment parts 62 to 65 includes a first left attachment part 62, a second left attachment part 63, a first right attachment part 64, and a second right attachment part 65.

The first left attachment part 62 and the second left attachment part 63 are provided on the upper left frame 34. The first left attachment part 62 and the second left attachment part 63 are aligned lengthwise. The second left attachment part 63 is arranged rearward from the first left attachment part 62. The first right attachment part 64 and the second right attachment part 65 are provided on the upper right frame 37. The first right attachment part 64 and the second right attachment part 65 are aligned lengthwise. The second right attachment part 65 is arranged rearward from the first right attachment part 64.

The reinforcing beam 22 includes a plurality of bosses 66 to 69. The plurality of bosses 66 to 69 is arranged corresponding to the plurality of attachment parts 62 to 65 on the standard frame 21. More specifically, the plurality of bosses 66 to 69 includes a first left boss 66, a second left boss 67, a first right boss 68, and a second right boss 69.

As illustrated in FIG. 6, the first left boss 66 is provided on the front left corner 551. The first left boss 66 is attached to the first left attachment part 62. The second left boss 67 is provided on the rear left corner 512. The second left boss 67 is attached to the second left attachment part 63. The first right boss 68 is provided on the front right corner 521. The first right boss 68 is attached to the first right attachment part 64. The second right boss 69 is provided on the rear right corner 522. The second right boss 69 is attached to the second right attachment part 65.

Figure 9:
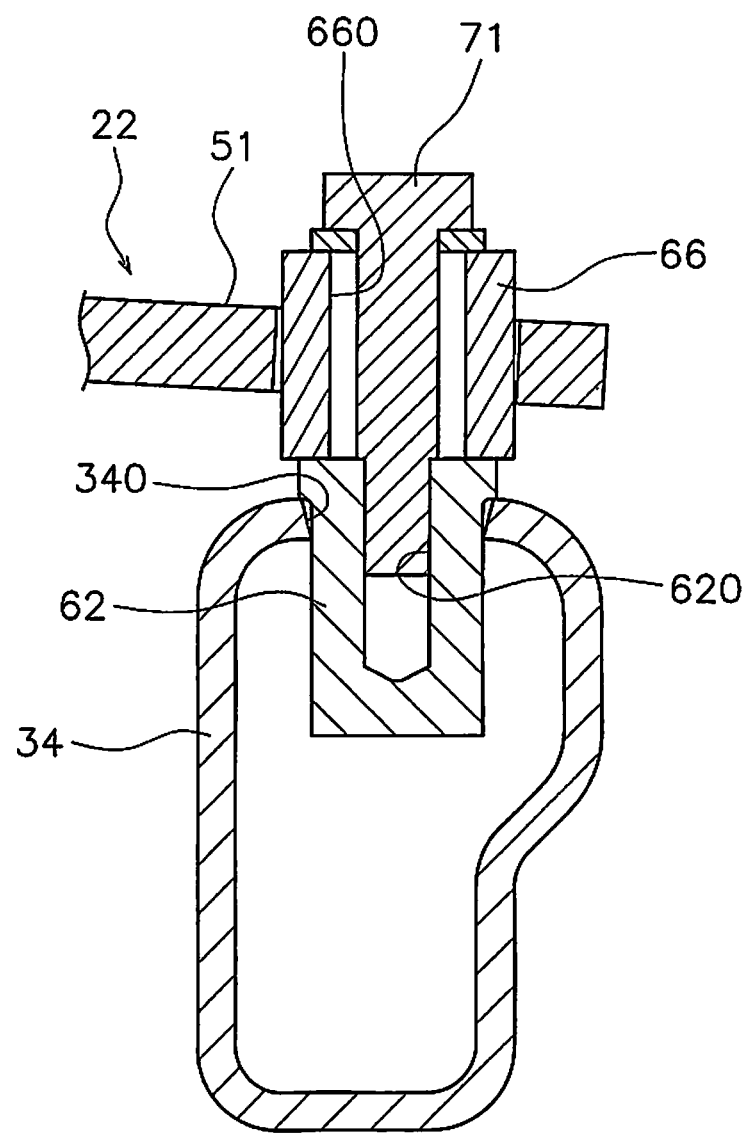
FIG. 9 is a cross-sectional view of a first left attachment, a first left boss, and an upper left frame.

FIG. 9 is a cross-sectional view of the first left attachment part 62, the first left boss 66, and the upper left frame 34. As illustrated in FIG. 9, the first left attachment part 62 is attached to the upper left frame 34. The first left attachment part 62 is inserted into an opening 340 provided in the top surface of the upper left frame 3. The lower part of the first left attachment part 62 is arranged inside the upper left frame 34. The upper part of the first left attachment part 62 is arranged on the top surface of the upper left frame 34. The first left attachment part 62 includes a bolt hole 620. The bolt hole 620 extends vertically, and opens in the top surface of the first left attachment part 62.

The first left boss 66 protrudes from the top and bottom of the left section 51. The first left boss 66 includes a through hole 660. The through hole 660 passes through the first left boss 66 vertically. The through hole 660 in the first left boss 66 is arranged corresponding to the bolt hole 620 in the first left attachment part 62. A bolt 71 is inserted through the through hole 660 in the first left boss 66 and the bolt hole 620 in the first left attachment part 62 to attach the first left boss 66 to the first left attachment part 62.

The structures of the second left attachment part 63, the first right attachment part 64, and the second right attachment part 65 are respectively identical to the first left attachment part 62. The structures of the second left boss 67, the first right boss 68, and the second right boss 69 are respectively identical to the first left boss 66.

As illustrated in FIG. 3, the second left boss 67 is attached to the second left attachment part 63 using a bolt 72. The first right boss 68 is attached to the first right attachment part 64 using a bolt 73. The second right boss 69 is attached to the second right attachment part 65 using a bolt 74. The reinforcing beam 22 is therefore secured to the first through fourth attachment parts 62 to 65 in this manner using the bolts 71 to 74.

The above described cab 6 according to the exemplary embodiment is constructed in the following manner.

First, the standard frame is manufactured. To produce the standard frame 21, a tube-like component is bent; a plurality of the tube-like components is secured to each other to form the upper left frame 34 and the upper right frame 37. A plurality of main beams 26 to 28 is secured to the upper left frame 34 and the upper right frame 37 to thereby create the main frame 23. Finally a plurality of plates 41 to 44 is secured to the main frame 23 thereby creating the standard frame 21. The frames, beams, and plates may be secured by welding for instance, however other means of fixing the components may be used such as bolts and the like.

Figure 10:
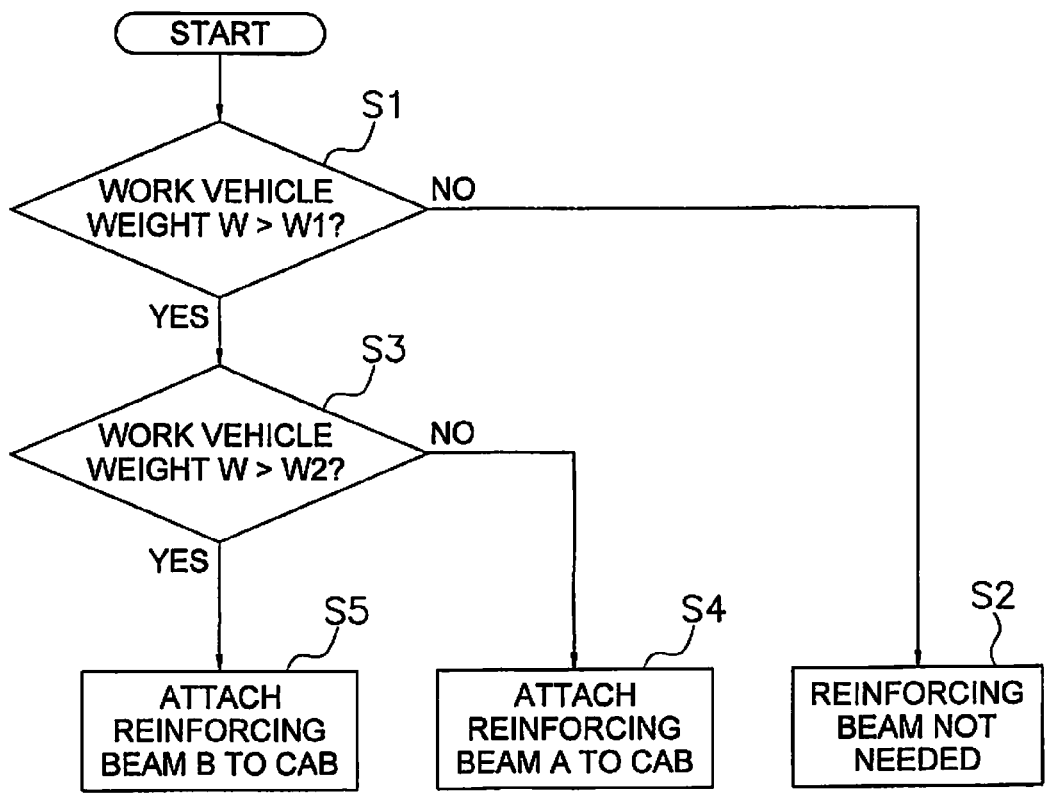
FIG. 10 illustrates a method of manufacturing the cab for the work vehicle according to the exemplary embodiments.

Next, the reinforcing beam 22 is attached to the standard frame 21. Here the reinforcing beam 22 is arranged above the roof plates 44 and attached to the upper left frame 34 and the upper right frame 37. A plurality of reinforcing beams 22 of different strengths may be prepared and the reinforcing beam 22 selected in accordance with the weight of the work vehicle 1 with the mounted cab 6. Having or not having the reinforcing beam 22 may also be selected in accordance with the weight of the work of vehicle 1 with the mounted cab 6. FIG. 10 is a flowchart illustrating an example of how the work vehicle 1 may be manufactured. It is determined whether or not the weight W of the work vehicle 1 with mounted cab 6 exceeds a first weight W1 (S1). The first weight W1 is a weight at which a cab equipped with the standard frame 21 but not the reinforcing beam 22 is capable of providing sufficient rollover protection. The reinforcing beam is not attached when the weight W is less than or equal to the first weight W1 (S2).

It is determined whether or not the weight W exceeds a second weight W2 when the weight W is greater than the first weight W1 (S3). The second weight W2 is larger than the first weight W1. The second weight W2 is a weight at which a cab provided with a reinforcing beam A attached to the standard frame 21 is capable of providing sufficient rollover protection. A reinforcing beam A is attached when the weight W is less than or equal to the second weight W2 (S4). A reinforcing beam B is added when the weight W is greater than the second weight W2 (S4). The reinforcing beam B is stronger than the reinforcing beam A. For instance, a cab provided with a standard frame 21 with a reinforcing beam B attached thereto might be capable of providing sufficient rollover protection for the maximum possible weight for the work vehicle 1.

The reinforcing beam 22 may be attached to the standard frame 21 after the standard frame 21 is attached to the vehicle body 2. The reinforcing beam 22 may also be attached at a site different from the site at which the standard frame 21 was fabricated. For instance, the work vehicle 1 with the standard frame 21 mounted thereon may be delivered from the site that that fabricated the work vehicle 1, whereafter the reinforcing beam 22 may be attached depending on the work implement attachment attached to the work vehicle 1.

The above described cab 6 for the work vehicle 1 according to the exemplary embodiment includes the following features.

Attaching the reinforcing beam 22 to the upper left frame 34 and the upper right frame 37 of the standard frame 21 increases the strength of the standard frame 21. Hereby it is possible to adjust the strength of the cab 6 depending on the weight of the work vehicle 1. The reinforcing beam 22 is arranged above the roof plate 44 of the standard frame 21. Accordingly, the reinforcing beam 22 may therefore be easily attached to the standard frame 21 afterward. Thus, a reinforcing beam 22 may be attached in accordance with the weight of the work vehicle 1 while the standard frame 21 is shared. Hereby, a cab 6 may be easily constructed with strength in accordance with the weight of the work vehicle 1, and may have improved manufacturability.

The bend inducing parts 481 and 482 are provided on the third upper main beam 28. Consequently, the bend inducing parts 481 and 482 influences the bending site and the bending direction of the third upper main beam 28 to thereby prevent the deformation of the overturned cab 6 from affecting the space 50 occupied by an operator inside the cab 6. In addition, the reinforcing beam 22 does not overlap the third upper main beam 28 in a plan view of the cab 6. Therefore, the reinforcing beam 22 is prevented from interfering with the bending of the third upper main beam 28 when the third upper main beam 28 deforms.

The shape of the above-described kind of reinforcing beam 22 encourages the reinforcing beam 22 to bend and protrude upward. Thus, when the reinforcing beam 22 deforms because of a vehicle rollover, the reinforcing beam 22 will bend upward. Hereby, a portion of the energy of deformation received by the cab 6 may be absorbed. Additionally, the bent reinforcing beam 22 is prevented from affecting the space 50 occupied by an operator inside the cab.

The reinforcing beam 22 is a plate-like member. Thus, the reinforcing beam 22 is easy to manufacture. Additionally, this minimizes variations in the outward appearance of the cab 6 due to adding the reinforcing beam 22.

The reinforcing beam 22 includes a left opening 58 and a right opening 59 passing vertically therethrough. Thus, the reinforcing beam 22 may be made lightweight. Consequently, the increase to the weight of the cab 22 due to adding the reinforcing beam 22 is suppressed.

The reinforcing beam 22 is attached to the attachment parts 62 to 65 of the standard frame 21 using bolts 71 to 74. Thus, the reinforcing beam 22 is easy to attach.

Here ends the description of one exemplary embodiment of the present invention; the present invention is not limited to these descriptions but may be modified in various ways insofar as the modifications do not deviate from the spirit of the present invention.

The work vehicle is not limited to being a hydraulic excavator, and may be another kind of vehicle such as a bulldozer, or a wheel loader.

The structure of the standard frame is not limited to the above-mentioned exemplary embodiment and may be modified. The shape, or the arrangement of the reinforcing beam 22 is not limited to the above-mentioned exemplary embodiment and may be modified. For instance, the reinforcing beam 22 may be arranged to overlap the third upper main beam 28. The reinforcing beam 22 may appear rectangular in a plan view. The openings may be omitted from the reinforcing beam 22.

The means of attaching the reinforcing beam 22 to the standard frame 21 is not limited to the above-mentioned exemplary embodiment and may be modified. For instance, the reinforcing beam 22 may be welded to the standard frame 21.

In the above described exemplary embodiment the reinforcing beam 22 includes an upwardly protruding bend. However, the reinforcing beam 22 may be shaped to bend smoothly along a curved line. The first bend inducing part and the second bend inducing part are not limited to notches. For instance, the first bend inducing part and the second bend inducing part may be sections that are weaker than other sections of the reinforcing beam to influence the bending site and the bending direction thereof; alternatively, the first bend inducing part and the second bend inducing part may be components at which the stress from deformation tends to concentrate.

The present invention provides a cab for a work vehicle with strength in accordance with the weight of the work vehicle, as well as favorable manufacturability.

The invention claimed is:

1. A cab for a work vehicle, the cab comprising:
a standard frame including:
 a main frame including an upper left frame and an upper right frame arranged horizontally separated from each other and extending longitudinally; and
 a roof plate provided on an upper surface of the main frame and attached to the upper left frame and the upper right frame; and
a reinforcing beam arranged above the roof plate, the reinforcing beam having a left section attached to the upper left frame and a right section attached to the upper right frame, the reinforcing beam having a center section disposed horizontally between the left section and the right section, the reinforcing beam having an upwardly convex shape such that the center section is disposed higher than the left section and the right section.

2. The cab according to claim 1, wherein
the main frame further includes a main beam attached to the upper left frame and the upper right frame, the main beam being arranged below the roof plate.

3. The cab according to claim 2, wherein
the main beam includes a bend inducing part that influences a bending direction of the main beam when a load is applied to the main beam.

4. The cab according to claim 2, wherein
the reinforcing beam does not overlap the main beam in a plan view of the cab.

5. The cab according to claim 4, wherein
the reinforcing beam is arranged rearward from the main beam.

6. The cab according to claim 1, wherein
the reinforcing beam includes an upwardly protruding bend.

7. The cab according to claim 1, wherein
a bottom surface of the reinforcing beam includes a notch that is recessed upward.

8. The cab according to claim 1, wherein
the reinforcing beam is a plate-like member.

9. The cab according to claim 1, wherein
the reinforcing beam includes an opening passing vertically therethrough.

10. The cab according to claim 1, wherein
the upper left frame and the upper right frame include attachment parts which include bolt holes; and
the reinforcing beam is attached to the attachment parts using bolts.

11. The cab according to claim 1, wherein
the main frame further includes a main beam attached to the upper left frame and the upper right frame, the main beam including a first bend inducing part that influences a bending site and a bending direction thereof when a load is applied to the cab horizontally; and
the reinforcing beam includes a second bend inducing part that influences a bending site and a bending direction thereof when a load is applied to the cab horizontally, the reinforcing beam being arranged at a location not overlapping with the main beam in a plan view.

12. The cab according to claim 11, wherein the bending direction induced by the second bend inducing part is upward.

13. The cab according to claim 11, wherein the bending site induced by the second bend inducing part is the center section in the horizontal direction of the reinforcing beam.

14. The cab according to claim 11, wherein the second bend inducing part is a notch in the bottom surface of the reinforcing beam in the center section in the horizontal direction thereof, the notch extending longitudinally, and recessed upward.

15. A cab for a work vehicle, the cab comprising:
a standard frame including:
  a main frame including an upper left frame and an upper right frame arranged horizontally separated from each other and extending longitudinally; and
  a roof plate provided on an upper surface of the main frame and attached to the upper left frame and the upper right frame; and
a reinforcing beam arranged above the roof plate and attached to the upper left frame and the upper right frame, the reinforcing beam having an upwardly convex shape,
the reinforcing beam including a left section, a right section, and a center section located between the left section and the right section in the horizontal direction, and
the reinforcing beam growing shorter lengthwise from the left section and the right section toward the center section.

16. The cab according to claim 15, wherein the reinforcing beam includes
  a left opening located between the left section and the center section, passing vertically therethrough; and
  a right opening located between the right section and the center section, passing vertically therethrough.

17. A method of manufacturing a cab for a work vehicle, the method comprising:
forming a first reinforcing beam having a left section, a right section, and a center section disposed horizontally between the left section and the right section, the first reinforcing beam having a convex shape such that the center section protruded with respect to the left section and the right section;
arranging the first reinforcing beam on a standard frame including
  a main frame that includes an upper left frame and an upper right frame arranged horizontally separated from each other and extending longitudinally, and
  a roof plate provided on an upper surface of the main frame and attached to the upper left frame and the upper right frame,
the arranging of the first reinforcing beam including attaching the left section to the upper left frame and attaching the right section to the upper right frame such that the first reinforcing beam is disposed above the roof plate with the center section being disposed higher than the left section and the right section.

18. The method according to claim 17, wherein the forming of the first reinforcing beam is in accordance with a first work vehicle weight.

19. The method according to claim 18, further including forming a second reinforcing beam in accordance with a second work vehicle weight that is larger than the first work vehicle weight, the second reinforcing beam being configured to be arranged in the same manner as the first reinforcing beam; and
selecting the first reinforcing beam to be attached if a weight of the work vehicle is larger than the first work vehicle weight and smaller than or equal to the second work vehicle weight, and selecting the second reinforcing beam to be attached if the weight of the work vehicle is larger than the second work vehicle weight.

* * * * *